US008964169B2

(12) United States Patent
Chou et al.

(10) Patent No.: US 8,964,169 B2
(45) Date of Patent: Feb. 24, 2015

(54) RANGING METHOD AND SYSTEM

(75) Inventors: Zhi Chou, Guangdong (CN); Weiming Li, Guangdong (CN); Hongfei Wang, Guangdong (CN)

(73) Assignee: Mileseey Technology, Inc., Guangdong (CN)

( * ) Notice: Subject to any disclaimer, the term of this patent is extended or adjusted under 35 U.S.C. 154(b) by 0 days.

(21) Appl. No.: 13/704,664

(22) PCT Filed: Nov. 11, 2011

(86) PCT No.: PCT/CN2011/082114
§ 371 (c)(1),
(2), (4) Date: Dec. 17, 2012

(87) PCT Pub. No.: WO2013/067711
PCT Pub. Date: May 16, 2013

(65) Prior Publication Data

US 2014/0240693 A1 Aug. 28, 2014

(51) Int. Cl.
*G01S 17/32* (2006.01)
*G01B 11/14* (2006.01)

(52) U.S. Cl.
CPC ............... *G01S 17/325* (2013.01); *G01B 11/14* (2013.01)
USPC ....... 356/5.09; 356/3.01; 356/4.01; 356/5.01; 356/5.1

(58) Field of Classification Search
CPC ............ G01B 11/14; G01C 3/00; G01C 3/08; G01S 17/325
USPC ............ 356/3.01–3.15, 4.01–4.1, 5.01–5.15, 356/6–22, 28, 28.5
See application file for complete search history.

(56) References Cited

U.S. PATENT DOCUMENTS 5,125,736 A 6/1992 Vaninetti et al.
7,760,337 B2 7/2010 Yang
2005/0078296 A1* 4/2005 Bonnet ........................ 356/5.01

FOREIGN PATENT DOCUMENTS

WO WO 2011083476 A1 7/2011

OTHER PUBLICATIONS

Abstract of Chinese Patent—CN1540363, Oct. 27, 2004, 1 page.
Abstract of Chinese Patent—CN102043154, May 4, 2011, 1 page.
Abstract of Japanese Patent—JPH10246782, Sep. 14, 1998, 2 pages.
International Search Report for PCT/CN2011/082114 dated Aug. 16, 2012, 3 pages.

* cited by examiner

*Primary Examiner* — Luke Ratcliffe
(74) *Attorney, Agent, or Firm* — Dority & Manning, P.A.

(57) ABSTRACT

The invention relates to the topographic technique field, and provides a ranging method and a system, wherein the ranging method comprises the following steps: modulating measured beam, by a modulated signal of which the frequency is continuously changed over time; emitting the modulated measured beam to a measured object; receiving the reflected measured beam and converting the beam into the measured signals; and comparing the frequency of the modulated signal generated when the measured beam is received with the frequency of the measured signals, thus determining the measured distance.

6 Claims, 2 Drawing Sheets

3
1
Signal Generating Unit
Modulator
Emitting Device
31
Receiving Device
2
Frequency Mixer
6
Amplifier
5
4
Processor

RANGING METHOD AND SYSTEM

CROSS REFERENCE TO RELATED APPLICATION

This application is the national stage entry of International Patent Application No. PCT/CN2011/082114 having a filing date of Nov. 11, 2011, the entire contents of which are incorporated herein by reference.

FIELD OF THE INVENTION

The invention belongs to the topographic technique field, in particular to a ranging method and a system.

BACKGROUND OF THE INVENTION

Since the 1980s, semiconductor laser and digital circuit have made significant progress, based on which the laser ranging technology has become more and more widely used in the fields of electricity, water conservation, telecommunications, environment, construction, police, firefighting, blasting, marine, railways, military terrorism, etc.

In the time interval measurement of pulsed laser ranging, a direct counting method of a digital clock is generally adopted to calculate the time interval between laser emission pulse and received pulse, thereby obtaining the distance of a measured target. As the measured time interval is random, the number of clock cycles calculated by such a counter has errors and hence influences ranging accuracy.

However, as phase measurement requires one inner optical path reference signal, the internal structure and control method of a ranging device becomes complicated, increasing the manufacturing cost of the ranging device while not being conductive to miniaturization development of the ranging device.

SUMMARY OF THE INVENTION

One object of the invention is to provide a ranging method to solve complicate problem of the prior ranging method.

The embodiments of the invention realize the object through the following method: a ranging method comprises the following steps:

modulating measured beam, by a modulated signal of which the frequency is continuously changed over time;

emitting the modulated measured beam to a measured object;

receiving the reflected measured beam and converting the beam into the measured signals; and comparing the frequency of the modulated signal generated when the measured beam is received with the frequency of the measured signals, thus determining the measured distance.

The other object of the invention is to provide a ranging system. The ranging system comprises an emitting device for emitting measured beam and a receiving device for receiving the reflected measured beam and converting the beam into the measured signals. It is characterized in that the ranging system also comprises: a modulator which facilitates the frequency of the measured beam to be continuously changed over time; a frequency mixer which compares the frequency of the modulated signal of the modulator generated when the measured beam is received with the frequency of the measured signals; and a processor which determines the measured distance according to the compared results.

In the embodiment of the invention, firstly, modulating the measured beam by a modulated signal of which the frequency is continuously changed over time; then emitting the modulated measured beam to the measured object; thereafter, receiving the reflected measured beam and converting the beam into the measured signals; and finally, comparing the frequency of the modulated signal generated when the measured beam is received with the frequency of the measured signals, thus determining the measured distance. The ranging method has the advantages of a simple and pragmatic system and precise ranging.

DETAILED DESCRIPTION OF THE EMBODIMENTS

In order that the abovementioned objects, characteristics and advantages of the invention can be understood more easily, the invention is further described with the combination of drawings and embodiments of the invention in details. It shall be understood that the embodiments described here are only used for explanation for the invention but not for limiting the invention.

In the embodiment of the invention, firstly, modulating the measured beam by a modulated signal of which the frequency is continuously changed over time; then emitting the modulated measured beam to the measured object; thereafter, receiving the reflected measured beam and converting the beam into the measured signals; and finally, comparing the frequency of the modulated signal generated when the measured beam is received with the frequency of the measured signals, thus determining the measured distance. The ranging method has the advantages of a simple and pragmatic system and precise ranging.

The invention is realized through the following laser taken as an example in details.

Figure 1:
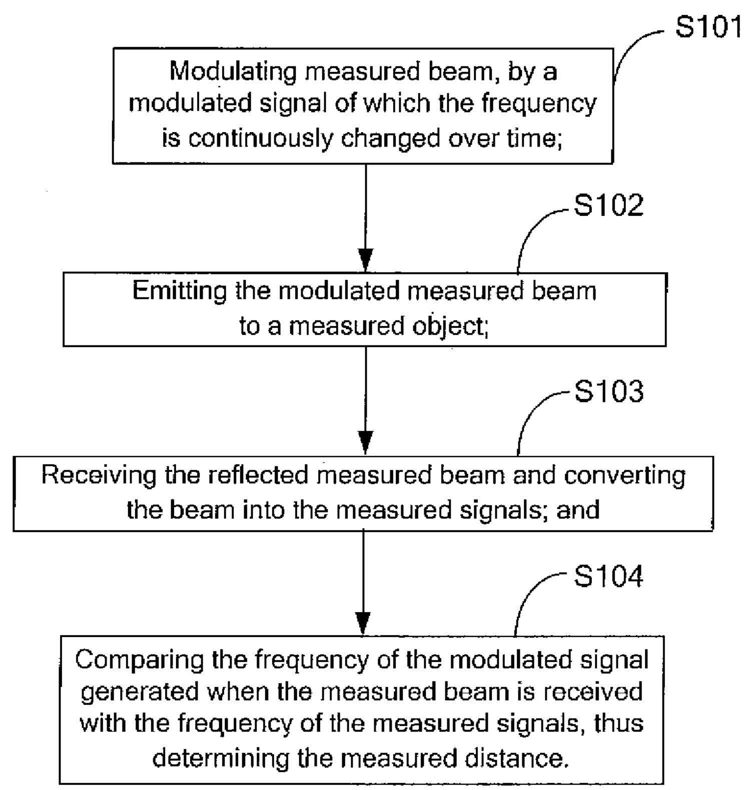
FIG. 1 is a realization flow chart of a ranging method provided in the embodiments of the invention.

FIG. 1 is a realization flow chart of a ranging method provided in the embodiments of the invention, which is described in details as follows;

In the Step S101, the measured beam is modulated by a modulated signal of which the frequency is continuously changed over time.

In the embodiment of the invention, laser is modulated by a modulated signal $\omega=f(t)=\alpha t|\beta$ of which the frequency is changed over time based on linear variation Of course, the laser is also modulated by the modulated signal of which the frequency is continuously changed over time based on other function, for example, a tangent function or a cotangent function of one complete cycle.

In Step S102, the modulated measured beam is emitted to a measured object;

In the embodiment of the invention, the modulated measured beam is emitted to a measured object by a laser emitted device.

In Step S103, the reflected measured beam is received and converted into the measured signals;

In the embodiments of the invention, the measured beam which is reflected by the measured object is received by a laser receiving device, and the received measured beam is converted into the measured signal at the same time.

In Step S104, the frequency of the modulated signal generated when the measured beam is compared with the frequency of the measured signals, and determines the measured distance.

In embodiments of invention, the frequency $\omega_2=f(t_2)=\alpha t_2+\beta$ of the modulated signal generated when the measured beam is received is compared with the frequency $\omega_1=f(t_1)=\alpha t_1+\beta$ of the measured signals, thus determining the measured distance. Based on the frequency $\omega_1=f(t_2)=\alpha t_2+\beta$ of the modulated signal generated when the measured beam is received and the frequency $\omega_1=f(t_1)=\alpha t_1+\beta$ of the measured signal, the deference of $$\Delta t = t_2 - t_1 = \frac{\omega_2 - \omega_1}{\alpha}$$

between the time $t_2$ when the measured beam is received and the time $t_1$ when the measured beam is emitted are obtained, which is the time during the measured beam travels in the air; wherein $\omega_2-\omega_1$ is the frequency of the signal formed after the modulated signal generated when the measured beam is received and the measured signal are mixed. The frequency of the signal formed after the frequency is mixed is input into a processor, and then the time during the measured beam travels in the air is calculated, thus determining the measured distance through speed of light.

In order that the difference of $\omega_1$ and $\omega_2$ is calculated, and the measurement precise is guaranteed, the change speed of the frequency in the embodiment of the invention shall be bigger than and equal to 10 MHz/s, i.e, $\alpha\geq 10$ MHz/s.

Figure 2:
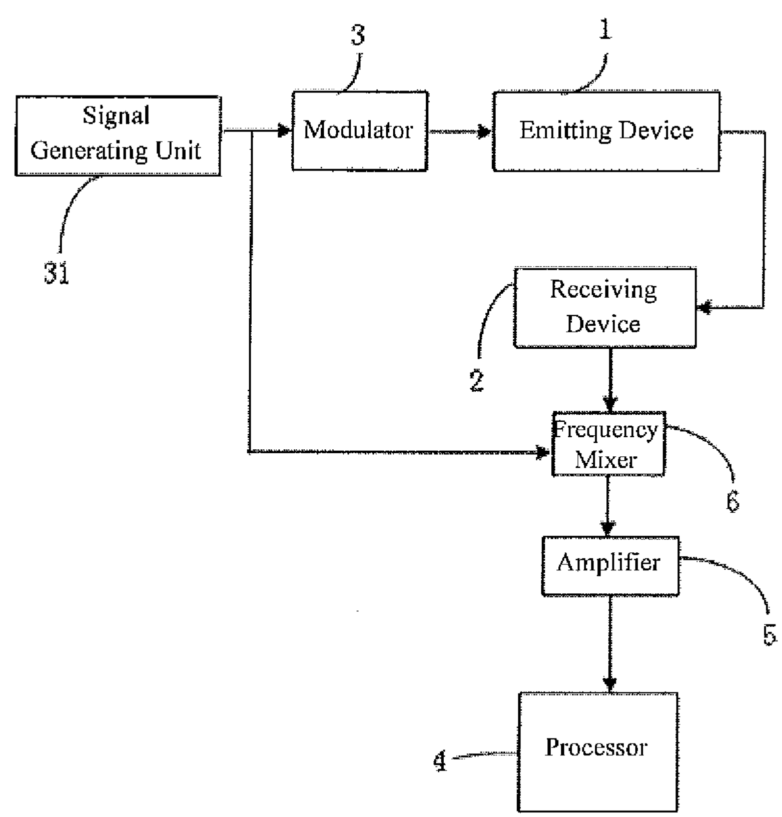
FIG. 2 is a structural schematic diagram of a ranging system provided in the embodiments of the invention.

FIG. 2 is a structural schematic diagram of a ranging system provided in the embodiments of the invention. In order to conveniently describe the invention, only the part relevant to the embodiments of the invention is shown.

The ranging system comprises: an emitting device 1 for emitting measured beam, a receiving device 2 for receiving the reflected measured beam and converting the beam into the measured signals; a modulator 3 facilitating the frequency of the measured beam to be continuously changed over time; a frequency mixer 6 which compares the frequency of the modulated signal of the modulator generated when the measured beam is received with the frequency of the measured signals; and a processor 4 which determines the measured distance according to the compared results. Therefore, the system has the advantages of a simple and reliable structure and precise measurement.

In order that the ranging system is simplified, the frequency mixer 6 shall be integrated into the receiving device 2. The modulated signal generated by the modulator 3 is transmitted to the receiving device 2 in real time and implemented with minus average operation together with the measured signals. The processor 4 updates the measured distance based on the result after the result is processed with minus average operation, so as to facilitate the application of the ranging system to be used more widely.

The modulator 3 in the embodiments of the invention has one signal generating unit 31 used for generating the modulated signals. The receiving device 2 is preferably an avalanche photodiode. The frequency of the signal processed by the frequency mixer 6 is amplified via an amplifier 5 and transmitted to the processor 4, thus facilitating the processor 4 to implement identification and process.

The abovementioned are only preferable embodiments of the invention and do not limit the invention. Any modification, equality, substitution, improvement, etc., which is implemented within the spirit and principles of the invention shall be included in the protection scope of the invention.

The invention claimed is:

1. A ranging method comprising the following steps:

modulating a measured beam, by a modulated signal of which the frequency is continuously changed over time wherein a modulator facilitates the frequency of the measured beam to be continuously changed over time;

emitting the modulated measured beam to a measured object with an emitting device;

receiving the reflected measured beam with a receiving device, wherein the receiving device is an avalanche photodiode, and converting the beam into the measured signals; and comparing the frequency of the modulated signal generated when the measured beam is received with the frequency of the measured signals, wherein a frequency mixer compares the frequency of the modulated signal generated when the measured beam is received with the frequency of the measured signals, wherein the frequency mixer is integrated into the receiving device, and wherein the generated modulated signal is transmitted to the receiving device in real time by the modulator and implemented with minus average operation together with the measured signals, thus determining the measured distance, wherein a processor determines the measured distance according to the compared results.

2. The ranging method according to claim 1, wherein the frequency of the modulated signal is changed over time based on linear variation.

3. The ranging method according to claim 1, wherein the speed of the frequency change is more than or equal to 10 MHz/s.

4. A ranging system, comprising: an emitting device, being used for emitting a measured beam; and a receiving device, being used for receiving the reflected measured beam and converting the beam into measured signals, wherein the receiving device is an avalanche photodiode, being characterized in that: the ranging system also comprises a modulator which facilitates the frequency of the measured beam to be continuously changed over time; a frequency mixer which compares the frequency of a modulated signal generated when the measured beam is received with the frequency of the measured signals, wherein the frequency mixer is integrated into the receiving device, and wherein the generated modulated signal is transmitted to the receiving device in real time by the modulator and implemented with minus average operation together with the measured signals; and a processor which determines the measured distance according to the compared results.

5. The ranging method according to claim 4, wherein the modulator has one signal generating unit used for generating the modulated signal.

6. The ranging system according to claim 4, wherein the frequency signal after processed by the frequency mixer is transmitted to the processor after the frequency signal is amplified by an amplifier.

* * * * *

UNITED STATES PATENT AND TRADEMARK OFFICE

CERTIFICATE OF CORRECTION

PATENT NO. : 8,964,169 B2
APPLICATION NO. : 13/704664
DATED : February 24, 2015
INVENTOR(S) : Zhi Chou, Weiming Li and Hongfei Wang It is certified that error appears in the above-identified patent and that said Letters Patent is hereby corrected as shown below:

In the Claims

Claim 1 (column 4, line 10)

"...which the frequency is continuously changed over time..." should read --...which the frequency is continuously changed over time,...--

Claim 1 (column 4, line 18)

"...photodiode, and converting the beam into the measured..." should read --...photodiode, and converting the beam into measured...--

Signed and Sealed this
Twenty-first Day of July, 2015

Michelle K. Lee
*Director of the United States Patent and Trademark Office*